United States Patent [19]

Stemmle et al.

[11] Patent Number: 5,442,449
[45] Date of Patent: Aug. 15, 1995

[54] PORTABLE COPIER AND METHOD OF USING A PORTABLE COPIER

[75] Inventors: Denis J. Stemmle, Webster, N.Y.; Egon Babler, Northbrook, Ill.

[73] Assignee: Xerox Corporation, Stamford, Conn.

[21] Appl. No.: 139,776

[22] Filed: Oct. 22, 1993

[51] Int. Cl.6 .................. H04N 1/032; H04N 1/04; G01D 15/10
[52] U.S. Cl. .................. 358/296; 358/496; 347/214
[58] Field of Search ............... 358/296, 401, 472, 496, 358/497, 498; 347/3, 214

[56] References Cited

U.S. PATENT DOCUMENTS

| | | | |
|---|---|---|---|
| 3,480,962 | 9/1965 | Weigl et al. | 347/3 |
| 4,379,300 | 4/1983 | Fischbeck | 347/3 |
| 4,476,496 | 10/1984 | Thaler | 358/296 X |
| 4,583,126 | 4/1986 | Stoffel | 358/294 |
| 4,823,195 | 4/1989 | Ito | 358/296 X |
| 4,920,421 | 4/1990 | Stemmle | 358/296 |
| 5,032,922 | 7/1991 | Stemmle | 358/296 |
| 5,040,074 | 8/1991 | Stemmle | 358/296 |
| 5,049,999 | 9/1991 | Stemmle | 358/296 |
| 5,077,614 | 12/1991 | Stemmle et al. | 358/296 |
| 5,153,736 | 10/1992 | Stemmle | 358/296 |
| 5,162,916 | 11/1992 | Stemmle et al. | 358/296 |
| 5,187,588 | 2/1993 | Stemmle | 358/296 |
| 5,245,447 | 9/1993 | Stemmle | 358/296 X |
| 5,249,062 | 9/1993 | Ejiri et al. | 358/296 |

*Primary Examiner*—Peter S. Wong
*Assistant Examiner*—Eric Frahm
*Attorney, Agent, or Firm*—Oliff & Berridge

[57] ABSTRACT

A scanner disposed within a portable copier includes a scan carriage, a document indexer for transporting a document along a document transport path, a copy sheet indexer for transporting a copy sheet along a copy sheet transport path, and a printhead and ink supply cartridge, preferably a ribbon cartridge, supported by the scan carriage. The document and copy sheet paths are disposed on opposite sides of the ribbon cartridge, allowing removal and replacement of the ribbon cartridge on the scan carriage without disturbing the position of either the copy sheet or the document. Separate motors drive the document and copy sheet indexers, so that the copy sheet may be ejected from the device without advancing the document and without moving the scan carriage.

24 Claims, 7 Drawing Sheets

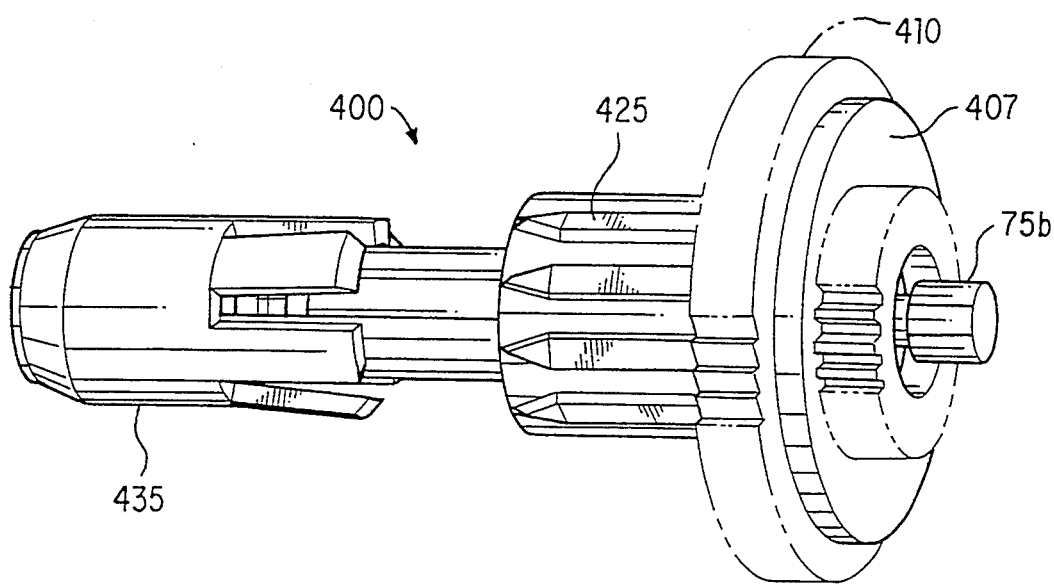
FIG. 7
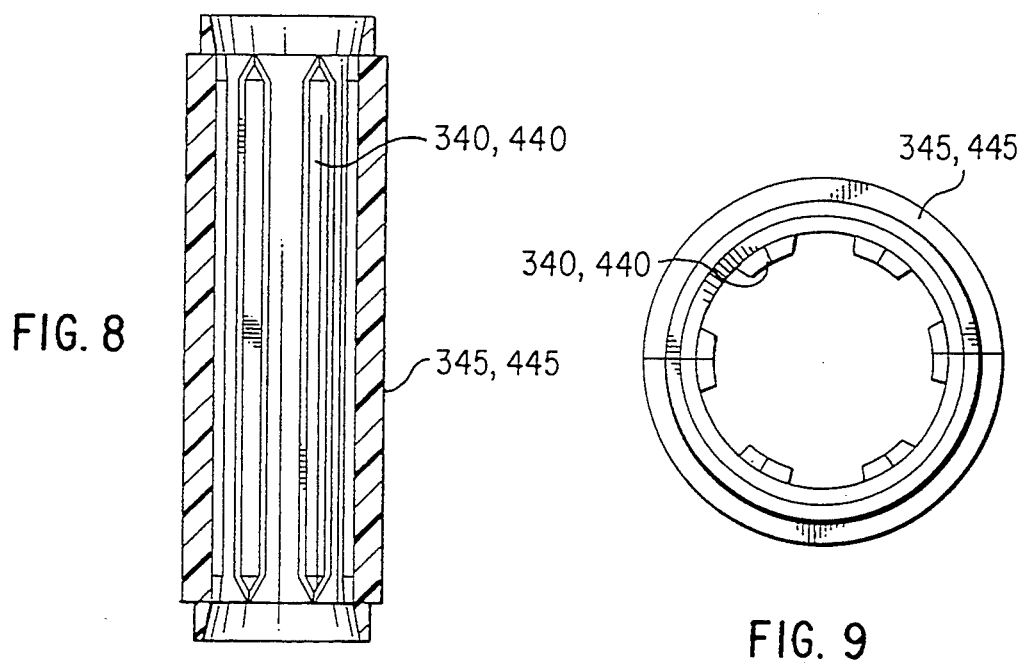
FIG. 8
FIG. 9

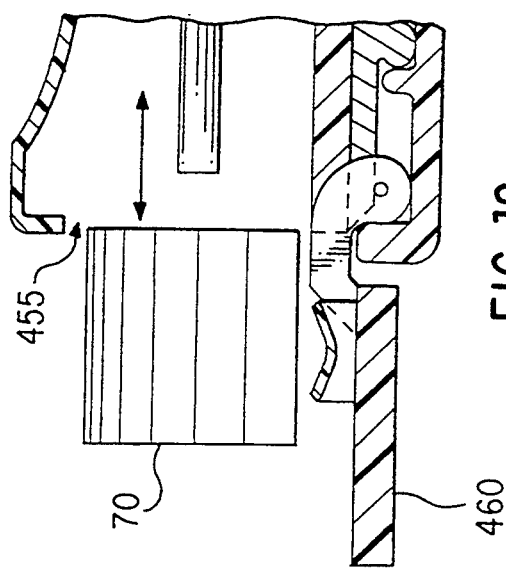
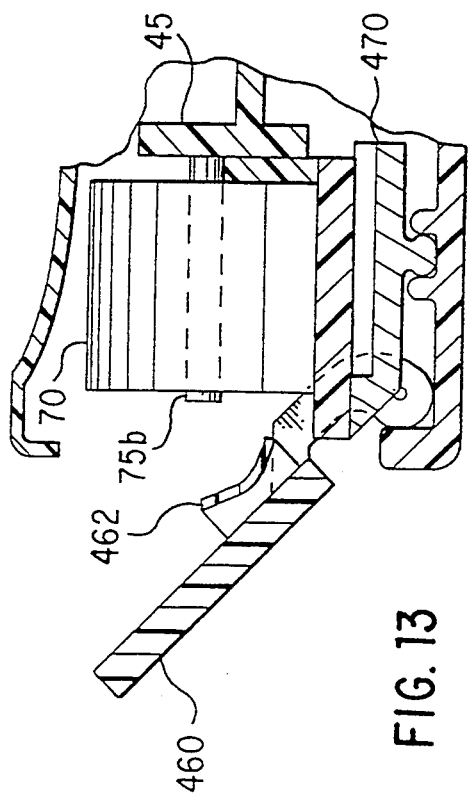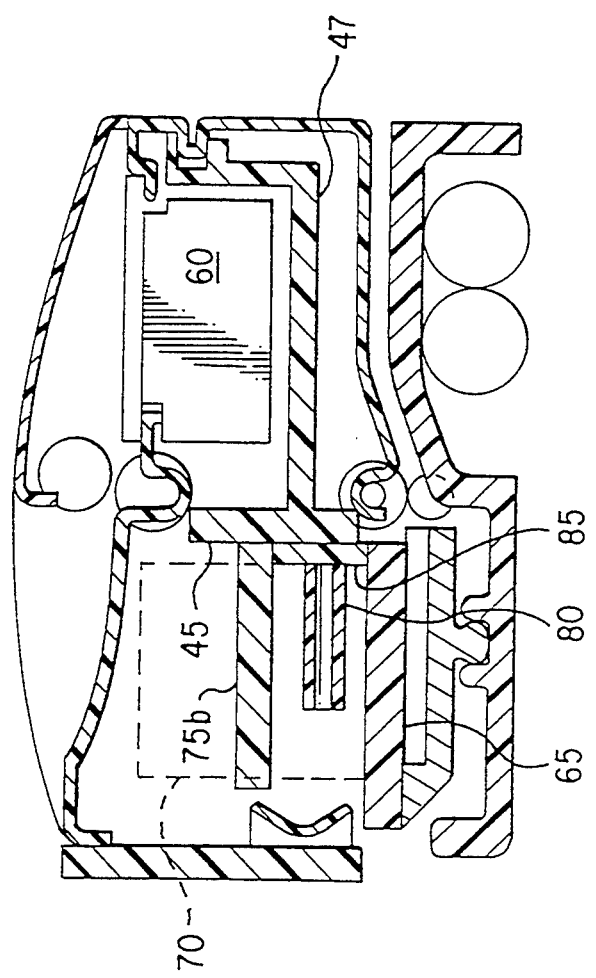

PORTABLE COPIER AND METHOD OF USING A PORTABLE COPIER

CROSS-REFERENCE TO RELATED APPLICATIONS

This application is related to the following applications, all filed concurrently with this application and commonly assigned to the Assignee of this application.
1) U.S. patent application No. 08/139,783, entitled "RIBBON CARTRIDGE," by Egon Babler and Denis J. Stemmle;
2) U.S. patent application No. 08/139,786, entitled PIVOTING PLATEN FOR USE IN PRINTING DEVICE, by Denis J. Stemmle, U.S. Pat. No. 5,425,588; and
3) U.S. patent application No. 08/139,773, entitled SPLIT-SPLINE HUB AND LATCH MECHANISM, by James Alday.

The disclosures of these applications are incorporated herein by reference.

BACKGROUND OF THE INVENTION

1. Field of the Invention

The invention relates to copiers, and more particularly to copiers that use disposable ribbon cartridges, such as portable copiers.

2. Description of Related Art

Portable printing devices, such as copiers, printers, typewriters and facsimile machines, frequently use replaceable components, such as ribbon cartridges and batteries. To maximize the efficiency of these printing devices, a high number of output pages per ribbon cartridge and per battery charge is desirable.

In typical plain paper facsimile machines using thermal transfer technology, a ribbon cartridge may contain enough ribbon to make 100 to 300 standard-size copy sheets before the ribbon cartridge needs to be replaced. In many such devices, which can also be used as copiers as well as fax machines, replacing the ribbon cartridge requires opening a portion of the device to access the ribbon cartridge and separating the nips holding the copy sheet, disturbing its position. If the ribbon runs out in mid-sheet, therefore, as often happens, the copy sheet being printed upon when the ribbon runs out must be discarded and the corresponding document recopied. This wastes ribbon, paper, and power. A need has arisen, therefore, for a copier capable of halting copy sheet advance and allowing ribbon cartridge replacement without disturbing the copy sheet position, or, for that matter, the position of the original document.

Previous copiers also include inefficiencies in the drive trains of their components. In U.S. Pat. No. 5,187,588 to Stemmle, for example, the disclosure of which is incorporated herein by reference, a motor drives a scan carriage along a linear reciprocating path, causing the scan carriage to engage followers, which turn two barrel cams and cause document and copy sheet index shafts to rotate so as to advance the document and copy sheet. Thus, rotary motion of a drive motor shaft is converted into linear scan carriage motion, and then the linear scan carriage motion is converted into rotary motion of document and copy sheet index shafts. Converting rotary motion to linear motion and then back to rotary motion is energy-inefficient, requiring a relatively high amount of energy, leading to rapid battery depletion.

The copier in the 588 patent also uses only a small portion of linear carriage motion to generate index shaft rotary motion (via barrel cams), contributing to system inefficiency. Additionally, carriage motion is required for every index cycle, even to advance an already-completed copy sheet from the copier. Finally, actuating both the index shafts and the scan carriage with one drive motor causes high loads on the motor, contributing to system inefficiency. There is, accordingly, a need for a more energy-efficient actuating system for portable copier document indexers, copy sheet indexers and scan carriages.

Minimizing the size of portable copiers also is desirable, preferrably to a size allowing the copier to be placed in a briefcase. Placing the copier parallel to the short edge of the briefcase allows room for other contents. Surveys of standard briefcase sizes have shown that if the length of a portable copier can be kept below 11.7 inches, it will fit into over 80% of standard briefcases, parallel to the short edge. Previous portable copiers, however, all have maximum dimensions that are far in excess of this dimension.

One architectural feature affecting overall copier length is the alignment of the document relative to the copy sheet. Offset between the document and the copy sheet increases overall copier length by the amount of the offset. A second contributor to overall copier length for copiers using thermal transfer technology is ribbon cartridge size. Space must be made available for both the take-up roll and the supply roll of ribbon. If the ribbon rolls are mounted on the scan carriage, requiring separate areas for placement of the take-up and supply rolls, each area must contain sufficient space to hold the maximum diameters of both the supply and take-up rolls. This is in spite of the fact that the supply and take-up rolls never simultaneously occupy their maximum space. Finally, while the image sensing component could be positioned directly on top of the printhead component, this would require that the take-up and supply rolls be positioned on opposite sides of these components. Thus, the width of the imaging components as well as two full diameters of the ribbon rolls increase the overall length of the product. There is, accordingly, a need for a portable copier of reduced length.

Finally, in previous designs, indexing the copy sheet out of the copier requires moving the scan carriage and thus advancing the ribbon in the ribbon cartridge. When copying short documents onto a full-sized piece of copy sheet, therefore, advancing the copy sheet wastes ribbon and battery power. There is a need, therefore, to index the copy sheet independently of carriage motion.

U.S. Pat. No. 4,476,496 to Thaler shows a linear motor facsimile machine in which a motor-driven reciprocating block supports a printhead for printing on paper.

U.S. Pat. No. 4,823,195 to Ito shows a recording apparatus in which a ribbon cassette mounted on a reciprocating carriage supplies ink to a copy sheet. The copy sheet advances along a copy sheet path adjacent the carriage.

SUMMARY OF THE INVENTION

To overcome these and other disadvantages of the prior art, one embodiment of a scanner constructed in accordance with the invention includes a scan carriage, a document transport path, a copy sheet transport path and a printhead and ink supply cartridge supported by the scan carriage for printing on the copy sheet, wherein the ink supply cartridge is disposed between a document transport plane, defined by a portion of the document transport path, and a copy sheet transport plane, defined by a portion of the copy sheet transport path. The ink supply cartridge preferably includes an ink supply ribbon.

An image sensor is supported on the scan carriage and includes a line of photosites for reading image data from the document, the line of photosites preferably being aligned with a line of print elements on the printhead to reduce copier length. In one embodiment, the ink supply cartridge and the printhead are supported on a face of the scan carriage.

In accordance with one aspect of the invention, the ink supply cartridge can be removed and replaced without crossing the document transport plane or the copy sheet transport plane, and, therefore, without disturbing the position of either the copy sheet or the document. In one embodiment, a drive motor drives the document along the document transport path and drives the scan carriage, while a second drive motor drives the copy sheet along the copy sheet transport path. In an alternative embodiment, a first drive motor drives both the document and copy sheet along their respective paths while a second drive motor drives the scan carriage. Both embodiments allow the copy sheet to be ejected from the copier without moving the scan carriage.

In another embodiment according to the invention, an imaging apparatus for reading images and printing images is provided, and includes a scan carriage that supports a document reading unit and a copy sheet printing unit, which includes an ink supply cartridge and a printhead. The imaging apparatus transports the document along a document transport path on one side of the cartridge and transports the copy sheet along a copy sheet transport path on an opposite side of the cartridge. Preferably, the cartridge can be removed from the scan carriage and replaced without crossing the copy sheet transport path and without disturbing the position of either the document or the copy sheet.

In accordance with another aspect of the invention, a method of copying an image from a document to a copy sheet comprises the steps of feeding a document along a document transport path, feeding a copy sheet along a copy sheet transport path, reciprocating a scan carriage across the document and the copy sheet, replacing an ink supply cartridge without disturbing the position of the copy sheet or the document, and discharging the document and the copy sheet after copying is completed using the new cartridge. The document feeding step includes feeding the document along one side of the cartridge, and the copy sheet feeding step includes feeding the copy sheet along an opposite side of the cartridge. The cartridge can be disposed between a document transport plane, defined by a portion of the document transport path, and a copy sheet transport plane, defined by a portion of the copy sheet transport path.

These and other features of the invention are described in or apparent from the following detailed description of preferred embodiments.

BRIEF DESCRIPTION OF THE DRAWINGS

The preferred embodiments are described with reference to the drawings, in which like reference numerals denote like elements throughout the figures, and in which:

FIG. 7 is a perspective view of a ribbon take-up assembly according to an embodiment of the invention;

FIG. 8 is a cross-sectional view of a ribbon cartridge hub according to an embodiment of the invention;

FIG. 9 is an end view of the FIG. 8 ribbon cartridge hub;

FIG. 11 is a side view of the FIG. 10 portable copier, showing a copy sheet input chute in a closed position;

FIG. 12 is a side view of the FIG. 10 portable copier, showing a copy sheet input chute in a cartridge replacement position; and FIG. 13 is a side view of the FIG. 10 portable copier, showing a copy sheet input chute in a copy sheet loading position.

DETAILED DESCRIPTION OF PREFERRED EMBODIMENTS

Figure 1:
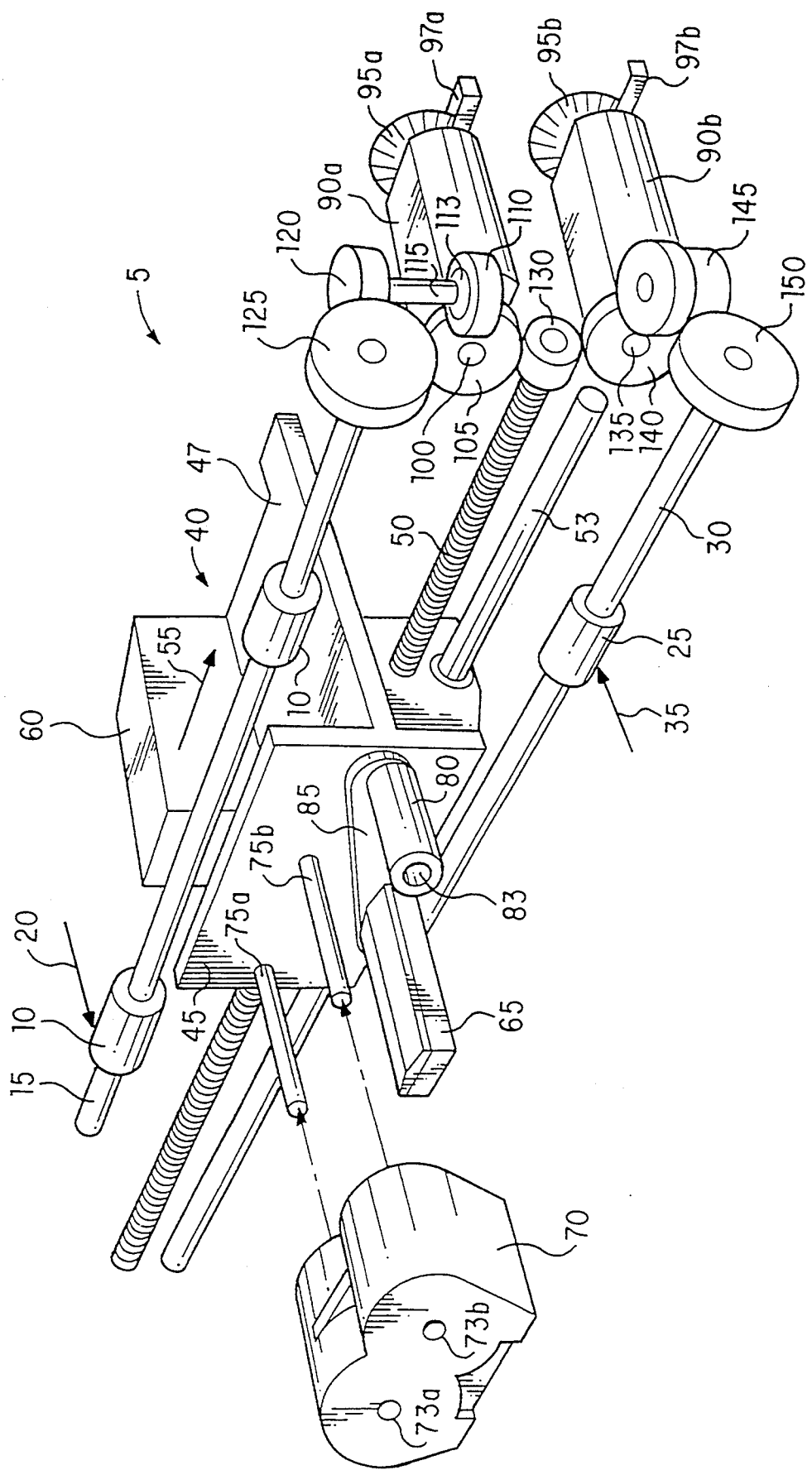
FIG. 1 is a perspective view showing a scanner and drive system according to an embodiment of the invention.
Figure 2:
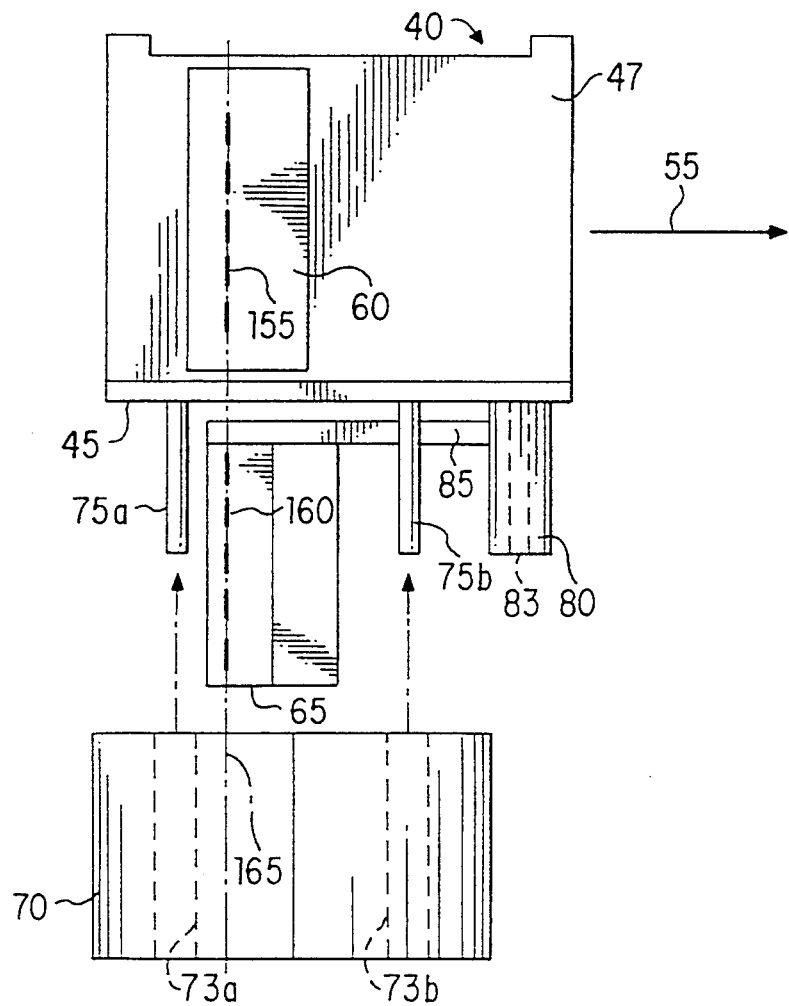
FIG. 2 is a top plan view showing a scan carriage according to an embodiment of the invention.
Figure 3:
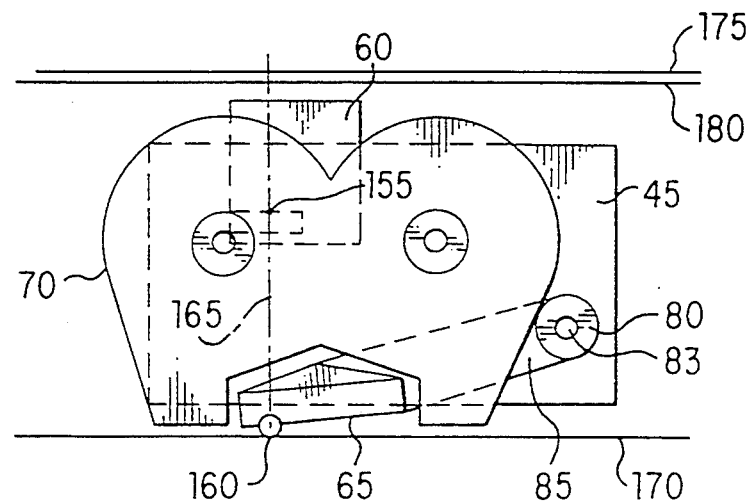
FIG. 3 is a front view showing a scan carriage with a ribbon cartridge mounted thereto according to an embodiment of the invention.

FIGS. 1–3 illustrate a preferred embodiment of scanner 5 and its drive system. Scan carriage 40 is driven by leadscrew 50 along guide rod 53 in a scan direction 55 and in a reverse direction opposite to the scan direction. Disposed above scan carriage 40 is a document indexer having rolls 10 mounted on shaft 15 for advancing a document along a document transport path in the direction of arrow 20. Disposed below scan carriage 40 is a copy sheet indexer having rolls 25 mounted on shaft 30 for advancing a copy sheet along a copy sheet transport path in the direction of arrow 35.

Motors 90a, 90b rotate document index shaft 15, copy sheet index shaft 30 and leadscrew 50. Output shaft 100 of motor 90a drives gear 105, which is engaged with gear 110 and with gear 130 mounted on leadscrew 50. Rotation of shaft 100 is transmitted by gear 110 through one-way clutch 113 to jack shaft 115, and then to gears 120, 125 and document shaft 15. Motor 90a thus causes document shaft 15 to rotate, advancing the document along the document transport path in the direction of arrow 20. Further, motor 90b independently drives copy sheet index shaft 30 via output shaft 135 and gears 140, 145 and 150. Motors 90a, 90b are preferably DC motors, that generate movement signals by encoder wheels 95a, 95b and sensors 97a, 97b, which are used to monitor and control the motors as is well known.

Scan carriage 40 includes vertical face 45 on which mandrels 75a, 75b are disposed, supporting removable ink supply cartridge 70. After a used cartridge 70 is removed, a replacement cartridge easily can be installed by aligning ribbon cartridge openings 73a, 73b with mandrels 75a, 75b and imparting a linear motion to ribbon cartridge 70 to engage the mandrels. Cartridge 70 preferably houses a thermal print ribbon, with thermal ink on an outside surface of the ribbon. Of course, other types of ribbons, such as pressure sensitive ribbons, also can be used depending on the type of printhead included in the printing device. Alternatively, cartridge 70 can include an ink reservoir and be used in an ink jet printing device.

Thermal printhead 65, which includes a line of printing elements 160 (FIG. 2), preferably resistor elements, engages the ribbon of ribbon cartridge 70 and prints on the copy sheet advanced by rolls 25. Printhead 65 is mounted on mounting arm 85, which includes a journal portion 80 that enables arm 85 to pivot about pin 83, which is mounted on and extends outward from carriage face 45. Mounting arm 85 is spring biased in a downward direction, allowing thermal printhead 65 to push the ribbon and copy sheet against an elastomeric platen (not shown) to transfer ink from the ribbon to the sheet when printing elements 160 on printhead 65 are heated. When carriage 40 completes each scan, that is, reaches the end of its movement in the direction of arrow 55, a mechanism (not shown) lifts and latches printhead 65 up and out of contact with the ribbon and copy sheet. Thus, when carriage 40 moves in its non-imaging direction (opposite arrow 55), a gap exists between printhead 65 and the ribbon, the copy sheet, and the elastomer platen. When carriage 40 reaches the end of its movement in the direction opposite arrow 55, the printhead latch is released, thus re-engaging printhead 65 against the ribbon, copy sheet, and elastomer platen under the influence of the spring biasing of arm 85.

Scan carriage 40 also supports contact image sensor 60 on carriage surface 47. Image sensor 60 includes a line of input photosites 155 (FIG. 2) for reading images from the document as scan carriage 40 moves in scan direction 55. Photosites 155 of image sensor 60 and printing elements 160 of thermal printhead 65 preferably are aligned with each other along axis 165, as shown in FIG. 2.

By aligning photosites 155 of image sensor 60 with print elements 160 of thermal printhead 65, overall copier length is minimized, because the registered sides of the document and copy sheet will not be offset from each other during copying. This allows for transport of the copier in, for example, a briefcase, and easier storage when not in use. Further, by positioning image sensor 60 offset from thermal printhead 65, instead of directly on top of it, as in previous devices, ribbon cartridge 70 may be positioned directly above the thermal printhead, as illustrated, for example, in FIG. 3. This permits the supply and takeup spools of the ribbon cartridge to be located closely adjacent to each other so that the areas occupied by the maximum diameters of the supply and take-up spools can partially overlap. This reduces the overall size of the ribbon cartridge. Thus, the configuration of the cartridge, image sensor and thermal printhead according to the invention minimizes overall product length and size.

As shown in FIG. 3, at least a portion of the document transport path defines a document transport plane 175 over document support glass (platen) 180, and at least a portion of the copy sheet transport path defines a copy sheet transport plane 170. Document transport plane 175 is disposed on one side of ribbon cartridge 70, and copy sheet transport plane 170 is disposed on an opposite side of ribbon cartridge 70, so that ribbon cartridge 70 is disposed between the planes 170, 175. Cartridge 70 can be removed through an opening in the body of the copier without crossing document transport plane 175 or copy sheet transport plane 170.

Whereas previous ribbon cartridges were removed and replaced through the bottom of the machine, necessitating release and/or removal of the copy sheet within its copy sheet path, the ribbon cartridge according to the invention can be removed without disturbing the position of the copy sheet within plane 170, or, for that matter, the document within plane 175. The configuration of planes 170, 175 and ribbon cartridge 70, therefore, allows the ribbon cartridge to be replaced while a document and copy sheet are within the copier. Thus, the full extent of the ribbon within ribbon cartridge 70 can be effectively used. No ribbon, paper, or battery power is wasted, as in the prior art.

The document and copy sheet can remain substantially flat and planar during reading/printing so that the entire document or copy sheet is located substantially in its respective plane 170, 175 during copying. Alternatively, the path of the document and/or the copy sheet can be curved before and/or after reading/printing so that only a portion of the document or copy sheet is located in its respective plane 170, 175 during copying. These portions would be the portions of the document or copy sheet that are being read or printed upon.

Referring to FIG. 1, in use, motor 90a rotates in a first direction to turn leadscrew 50 through the illustrated gearing arrangement, so as to drive scan carriage 40 in scan direction 55. During movement in the scan direction, one-way clutch 113 slips relative to jack shaft 115, so that document index shaft 15 and document index rolls 10 remain stationary.

At the end of the scan, that is, when scan carriage 40 has completed its movement in scan direction 55, motor 90a reverses, rotating leadscrew 50 in the opposite direction and causing scan carriage 40 to move in the reverse direction. During this return scan, one-way clutch 113 is engaged, allowing motor 90a to rotate document index shaft 15 and document index rolls 10 via jack shaft 115 and gears 120, 125, thereby indexing the document. Preferably, the gear ratios are designed so that full travel of scan carriage 40 in the reverse direction corresponds to a single indexing rotation of document index shaft 15.

At a selected time, preferably during return of scan carriage 40, motor 90b rotates, transmitting torque through gears 140, 145, 150 to rotate copy sheet index shaft 30 and copy sheet index rolls 25 through one full indexing rotation. Alternatively, copy sheet indexing need not be synchronous or simultaneous with document indexing.

By providing a separate motor 90b for copy sheet indexing, a copy sheet can be indexed out of the copier without moving scan carriage 40 or advancing (and wasting) the ribbon within ribbon cartridge 70. The invention thus advantageously allows copy sheet indexing independent of scan carriage motion after printing small images on a relatively large sheet of paper, or when the copier is used only as a printer or facsimile machine, for example.

Further, by converting rotary motion of motors 90a, 90b directly to rotary motion of document and copy sheet index shafts 15, 30, without interposed linear motion, and by using the entire return scan rather than just a small portion of it to index the document (as in U.S. Pat. No. 5,187,588, incorporated by reference above), system drive efficiency is increased. Accordingly, more copies can be made on a single battery charge.

Figure 4:
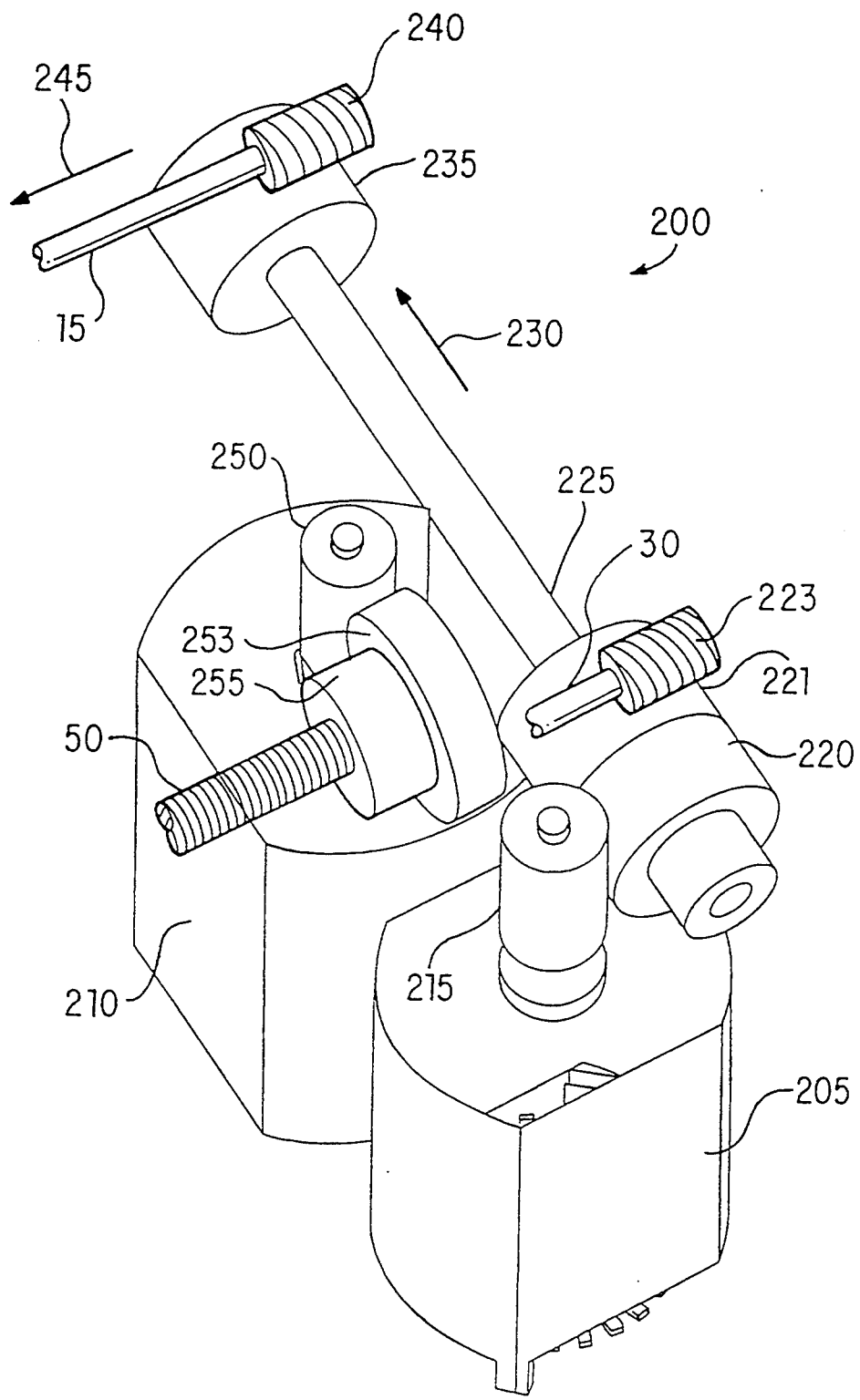
FIG. 4 is a perspective view of an alternative drive system for a scanner according to another embodiment of the invention.

FIG. 4 is a perspective view showing an alternative drive motor configuration 200 for shafts 15, 30 and leadscrew 50. Instead of using one motor to drive the copy sheet shaft and another motor to drive both the leadscrew and the document index shaft, as in the FIG. 1 embodiment, a first motor 205 drives both index shafts 15, 30 and a second, independent motor 210 drives leadscrew 50.

As shown in FIG. 4, motor 205 drives copy sheet index shaft 30 via gear modules 215, 220 and a worm pair including worm wheel 221 and driven member 223, which is mounted on copy sheet shaft 30. Motor 205 also drives document index shaft 15 via gear modules 215, 220, jack shaft 225 extending in a vertical direction 230, and a worm pair including worm wheel 235 mounted on jack shaft 225 and driven member 240 mounted on document index shaft 15, which extends in horizontal direction 245. Motor 210 drives leadscrew 50 via gear modules 250, 253 and 255.

Figure 5:
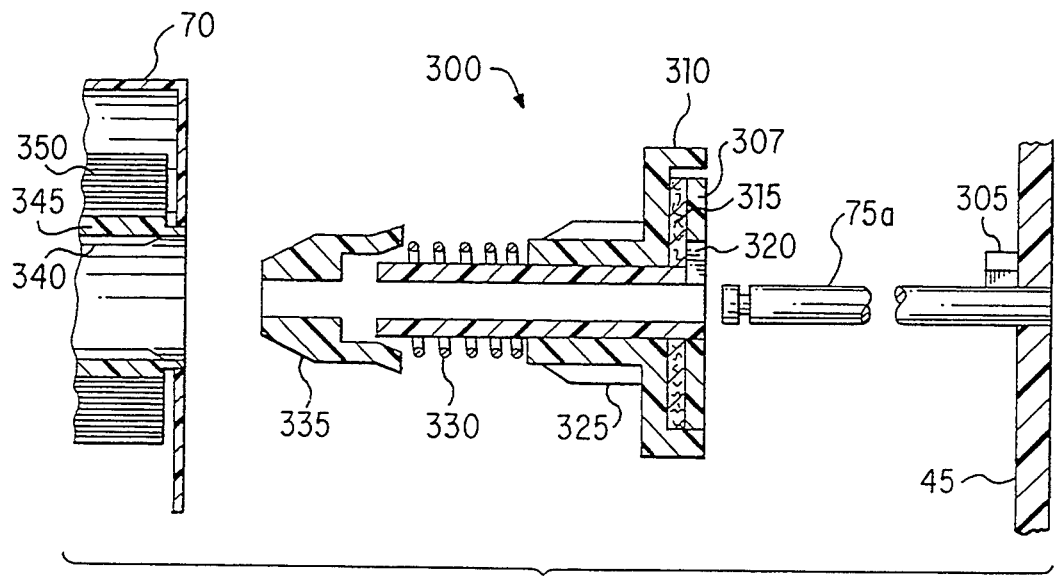
FIG. 5 is a side view of a ribbon supply assembly according to an embodiment of the invention.
Figure 6:
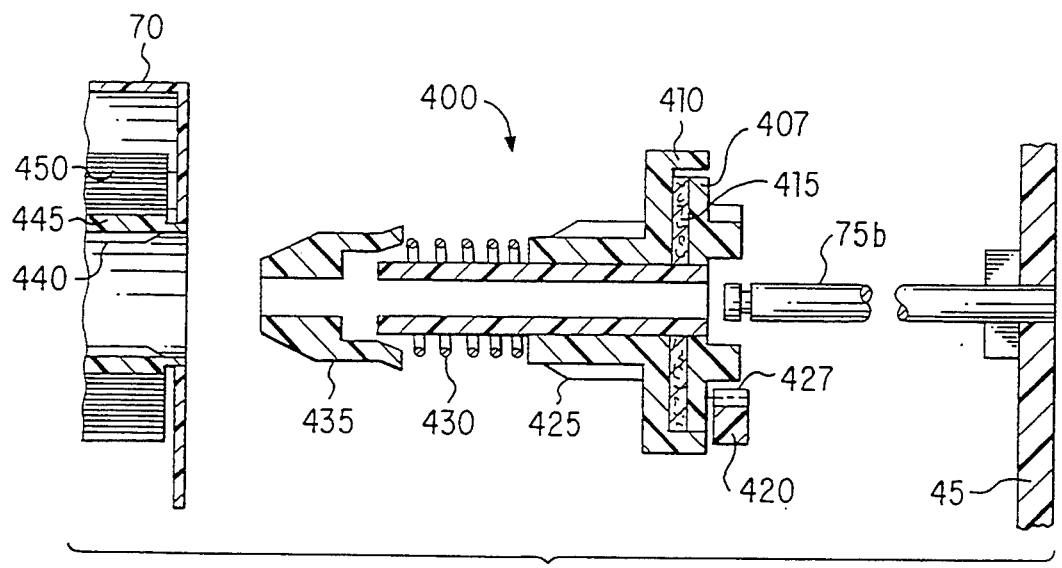
FIG. 6 is a side view of a ribbon take-up assembly according to an embodiment of the invention.
Figure 10:
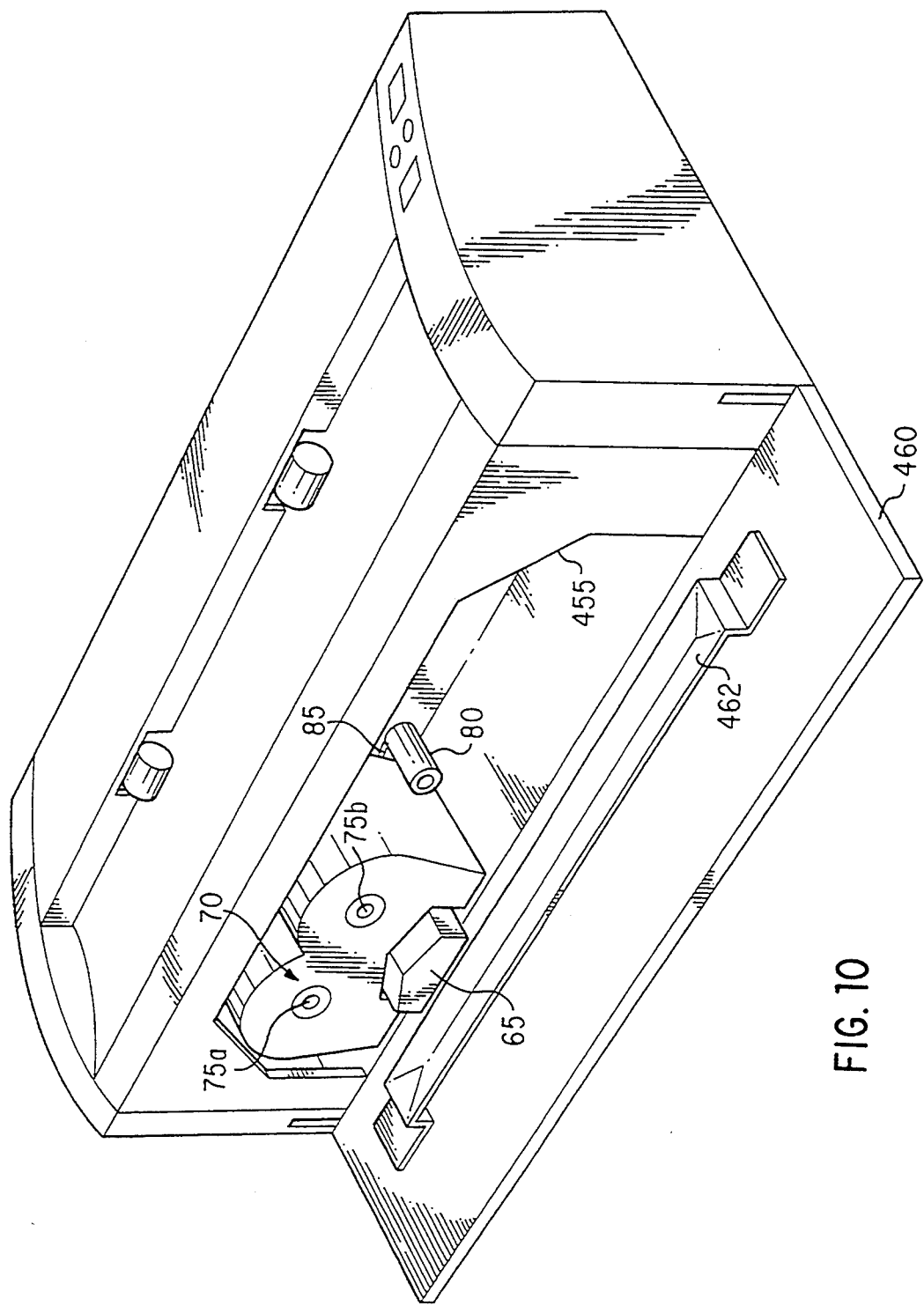
FIG. 10 is a perspective view of a portable copier according to the invention, showing an opening through which a ribbon cartridge can be removed.

FIGS. 5-6 show a preferred embodiment of an assembly for mounting ribbon cartridge 70 on mandrels 75a, 75b. One preferred manner in which the cartridge latches with mandrels 75a, 75b to keep the cartridge in place during use is described in detail in U.S. patent application No. 08/139,773, incorporated above. Of course, various alternative known latching mechanisms can be used to latch the cartridge in place on mandrels 75a, 75b. Ribbon cartridge 70 includes ribbon supply hub 345, around which is wrapped fresh ribbon 350 to form a ribbon supply roll, and ribbon take-up hub 445, around which used ribbon 450 is wrapped to form a ribbon take-up roll. Hubs 345, 445 are hollow and have internally disposed splines 340, 440 also shown in FIGS. 8-9.

Ribbon supply side brake assembly 300 includes non-rotating hub 307 mounted on mandrel 75a. Lock tab 305 on scan carriage face 45 enters keyway 320 within hub 307, preventing hub 307 from rotating. Rotatably mounted on non-rotating hub 307 is a rotating hub 310. Hub 310 has vanes 325 that engage splines 340 of ribbon supply hub 345. Spring 330, mounted between hub 310 and a cap 335 secured to the end of hub 307, biases hub 310 toward scan carriage face 45. Brake pad 315, preferably formed of felt, is pressed between rotating hub 310 and non-rotating hub 307 under the force of spring 330. Brake pad 315 brakes and stabilizes the movement of rotating hub 310, and, consequently, supply hub 345 of ribbon cartridge 70. This prevents the ribbon supply roll 350 from over-running during use, and keeps the desired amount of tension in the ribbon to prevent it from wrinkling or becoming tangled during use.

Ribbon take-up drive assembly 400 includes rotating drive hub 407, mounted on mandrel 75b. Fixed position rack 420, preferably extending the full length of scan carriage movement, engages teeth 427 on drive hub 407, causing drive hub 407 to rotate as the scan carriage moves in direction 55. A ratchet mechanism engages the outer surface of driven hub 410 to prevent it from rotating when the carriage is driven in the direction opposite direction 55, but to allow it to rotate when the carriage is driven in direction 55. Drive hub 407 rotates when the carriage is moved in either direction. Mounted on drive hub 407 is driven hub 410, which includes vanes 425 that engage splines 440 of take-up hub 445. Drive hub 407, driven hub 410 and take-up hub 445 thus rotate in concert with each other. Spring 430, positioned between driven hub 410 and a cap 435 secured to drive hub 407, urges driven hub 410 against clutch disk 415. Clutch disk 415, preferably formed of felt, therefore is pressed against drive hub 407 and transmits torque between hubs 407, 410.

To effectively take up ribbon at various diameters of take-up roll 450, clutch disk 415 is designed to slip between hubs 407, 410. The amount of slip varies as the diameter of take-up roll 450 increases as ribbon is taken up during use.

FIG. 7 is a perspective view of take-up drive assembly 400, showing rotating drive hub 407, driven hub 410, vanes 425, and cap 435.

FIGS. 10-13 show a portable copier embodiment according to the invention, including opening 455 through which ink supply cartridge 70 can be removed. Copy sheet input chute 460 is rotatable to three positions: a closed position for copier transport, shown in FIG. 11, in which opening 455 is covered by chute 460; a cartridge-replacement position, shown in FIGS. 10 and 12, in which a used cartridge can be replaced with a fresh cartridge; and a copy sheet loading position, shown in FIG. 13, for feeding a copy sheet into the copier. The copy sheet input chute 460 includes a copy sheet guide 462 for positioning and guiding a copy sheet so that it moves between the ribbon and a supporting platen 470. The cartridge 70 is replaced when the carriage 40 is located in the position (described earlier) where printhead 65 is latched up and out of contact with the ribbon and copy sheet so that the cartridge 70 can be replaced without disturbing the copy sheet.

While the invention has been described with reference to specific embodiments, the description is illustrative and is not to be construed as limiting the scope of the invention. For example, and without limitation, it will be appreciated that the scan and return directions of scan carriage 40 can be reversed, as can the positions of assemblies 300, 400 on mandrels 75a, 75b. Additionally, cartridges containing ribbons other than thermally sensitive inks can be used, such as ribbons having pressure sensitive inks, typically used with impact printers. Further, ink jet cartridges can be provided, instead of ribbon cartridges, for use in an ink jet printing device. In such a case, the thermal ink jet printhead and a cartridge containing ink in a chamber (instead of an a ribbon) would be located between the document transport plane and the copy sheet transport plane as detailed above. Further, the document and copy sheet transport paths need not be straight, but may be curved or bent, as desired. This invention also is applicable to copiers other than portable copiers. Various other modifications and changes may occur to those skilled in the art without departing from the spirit and scope of the invention.

What is claimed is:

1. A scanner comprising:
   a scan carriage;
   a document transport path;
   a copy sheet transport path;
   an image sensor supported on the scan carriage for sensing an image on a document on said document transport path; and
   a printhead and ink supply cartridge supported by the scan carriage for printing on a copy sheet transported along said copy sheet transport path;
   wherein a portion of the document transport path defines a document transport plane within the scanner on a document transport side of said ink supply cartridge; a portion of the copy sheet transport path defines a copy sheet transport plane within the scanner on a copy sheet transport side of said ink supply cartridge opposite from the document transport side of the ink supply cartridge; and the ink supply cartridge is disposed between the document transport plane and the copy sheet transport plane so the ink supply cartridge can be removed and replaced without crossing the document transport plane and the copy sheet transport plane and without disturbing the copy sheet and the document.

2. The scanner of claim 1, wherein the ink supply cartridge and printhead are supported on a face of the scan carriage.

3. The scanner of claim 2, wherein
said image sensor includes a line of photosites for reading image data from the document;
said printhead including a line of print elements for printing an image on a copy sheet transported along said copy sheet transport path;
wherein the line of photosites and the line of print elements are aligned with each other along a direction perpendicular to a direction of movement of the scan carriage.

4. The scanner of claim 1, wherein the printhead and the image sensor are offset from each other in a direction perpendicular to a direction of scan carriage movement.

5. The scanner of claim 4, wherein the ink supply cartridge and said printhead are supported on a face of the scan carriage.

6. The scanner of claim 1, wherein said ink supply cartridge is a ribbon cartridge having at least one hub, and further comprising at least one mandrel disposed on the scan carriage for slidably receiving the at least one hub of the ribbon cartridge.

7. The scanner of claim 1, further comprising a body within which the scan carriage, the document transport path, and the copy sheet transport path are disposed, the body including an opening, wherein while the copy sheet is within the body, the ink supply cartridge can be removed and replaced through the opening without crossing the document transport plane or the copy sheet transport plane and without moving either the copy sheet or the document.

8. The scanner of claim 1, further comprising a first drive motor fur alternately driving the scan carriage in a scan direction and in a reverse direction opposite to the scan direction;
wherein the document is driven along said document transport path by a rotating shaft connected to a clutch, the first drive motor drives the rotating shaft through the clutch to transport the document along the document transport path when the first drive motor drives the scan carriage in the reverse direction, and the clutch prevents the first drive motor from driving the rotating shaft when the first drive motor drives the scan carriage in the scan direction.

9. The scanner of claim 8, wherein the clutch permits said first drive motor to rotate the rotating shaft only one complete revolution as the first drive motor drives the scan carriage a full length of a scan carriage travel length in the reverse direction.

10. The scanner of claim 8, wherein a copy sheet is transported along said copy sheet transport path by a second rotating shaft driven by a second drive motor independent of the first drive motor.

11. The scanner of claim 1, wherein the document is driven along said document transport path by a first rotatable shaft and the copy sheet is driven along said copy sheet transport path by a second rotatable shaft, the scanner comprising a first drive motor for driving both the first rotatable shaft and the second rotatable shaft.

12. The scanner of claim 11, further comprising a second drive motor that alternately drives the scan carriage in a scan direction and in a reverse direction opposite the scan direction.

13. The scanner of claim 1, wherein said copy sheet transport plane is parallel to said document transport plane.

14. The scanner of claim 1, further comprising:
a document indexer for transporting the document along said document transport path; and
a copy sheet indexer for transporting the copy sheet along said copy sheet transport path.

15. The scanner of claim 1, wherein the ink supply cartridge includes an ink supply ribbon.

16. An imaging apparatus for reading images from an original document and printing images on a copy sheet, comprising:
a reciprocating scan carriage;
a document reading unit for reading an original document image; and
a copy sheet printing unit for printing a copy sheet image, the printing unit comprising an ink supply cartridge and a printhead for applying ink to the copy sheet;
wherein:
the reading unit and the printing unit are supported by the scan carriage; and
the imaging apparatus transports the original document along a document transport path on a document transport side of the ink supply cartridge and transports the copy sheet along a copy sheet transport path on a copy sheet transport side of the ink supply cartridge opposite from the document transport side so the ink supply cartridge can be removed and replaced without crossing the document transport path and the copy sheet transport path and without disturbing the copy sheet and the original document.

17. The imaging apparatus of claim 16, wherein the imaging apparatus includes a body within which the scan carriage is disposed, the body including an opening so that while the copy sheet is within the imaging apparatus, the ink supply cartridge can be removed from the scan carriage through the opening and replaced by a replacement ink supply cartridge without crossing the copy sheet transport path, and without disturbing a position of the copy sheet.

18. The imaging apparatus of claim 17, in which the ink supply cartridge can be removed from said scan carriage through said opening and replaced by the replacement ink supply cartridge while the original document is in the document transport path and while the copy sheet is in the copy sheet transport path, and without disturbing position of the original document.

19. The imaging apparatus of claim 16, wherein the ink supply cartridge includes an ink supply ribbon.

20. A method of copying an image from a document to a copy sheet, comprising the steps of:
feeding a document within a scanner along a document transport path;
feeding a copy sheet within the scanner along a copy sheet transport path;

reciprocating a scan carriage across the document and the copy sheet, the reciprocating step including the steps of:

reading image information from the document; and printing an image on the copy sheet, based on the image information read from the document, by applying ink from an ink supply cartridge to the copy sheet; and replacing the ink supply cartridge with another ink supply cartridge without disturbing a position of the copy sheet or a position of the document within the scanner.

21. The method of claim 20, further including the step of discharging the document the copy sheet from the scanner.

22. The method of claim 20, wherein the document feeding step includes feeding the document along one side of the ink supply cartridge and the copy sheet feeding step includes feeding the copy sheet along an opposite side of the ink supply cartridge.

23. The method of claim 20, wherein the document feeding step includes feeding the document within the scanner in a document transport plane that is defined by a portion of the document transport path, wherein the copy sheet feeding step includes feeding the copy sheet within the scanner in a copy sheet transport plane that is defined by a portion of the copy sheet transport path, and wherein the ink supply cartridge is disposed between the document transport plane and the copy sheet transport plane.

24. A portable copying apparatus reading images from an original document and printing images on a copy sheet, comprising:

a reciprocating scan carriage;

a document indexer for transporting the original document within the scanner along a document transport path past the scan carriage;

a copy sheet indexer for transporting the copy sheet within the scanner along a copy sheet transport path past the scan carriage;

a printhead and ribbon cartridge supported on the scan carriage for printing on the copy sheet transported along said copy sheet transport path;

an image sensor supported on the scan carriage for sensing an image on the original document transported by the document indexer along said document transport path; and a copying apparatus body within which the scan carriage, the document indexer, and the copy sheet indexer are disposed, the body including an opening so that while the copy sheet is within the copying apparatus, the ribbon cartridge can be removed through the opening and replaced without moving either the copy sheet or the original document;

wherein the document transport path is on one side of the ribbon cartridge and the copy sheet transport path is on an opposite side of the ribbon cartridge.

* * * * *